United States Patent [19]
Miyabayashi et al.

[11] 3,796,076
[45] Mar. 12, 1974

[54] DEVICE FOR LOCKING A LID OF A LUGGAGE COMPARTMENT OF A MOTOR VEHICLE

[75] Inventors: Yoshiyuki Miyabayashi; Kazuo Yamaha, both of Tokyo, Japan

[73] Assignee: Nissan Motor Company, Limited, Yokohama City, Japan

[22] Filed: Mar. 1, 1973

[21] Appl. No.: 337,197

[30] Foreign Application Priority Data
June 20, 1972 Japan.............................. 47-72101
Mar. 2, 1972 Japan.............................. 47-25175

[52] U.S. Cl................ 70/240, 70/156, 292/124, 292/DIG. 43
[51] Int. Cl............................................. E05b 65/19
[58] Field of Search......... 70/79, 97, 142, 144, 156, 70/240; 292/124, DIG. 43

[56] References Cited
UNITED STATES PATENTS
2,977,785  4/1961  Beckman.............................. 70/141
3,657,908  4/1972  Schwartz et al........................ 70/93

*Primary Examiner*—Albert G. Craig, Jr.

[57] ABSTRACT

A locking device comprises a striker and a lock lever which is rotatably mounted on a shaft extending perpendicularly to the longitudinal direction of a motor vehicle. The shaft is carried by a base member secured to a lid, while the striker to a luggage compartment. The lock lever has a lug extending transversely therefrom and also has a hook. A distance between the lug and the shaft is longer than a distance between the hook and the shaft. A cam is provided in the device which is operated by a key through a lock. The cam lifts the lug when the key is turned to its "unlock" position to release the hook from the striker. The lug and the hook are arranged about the shaft at a acute angle.

7 Claims, 7 Drawing Figures

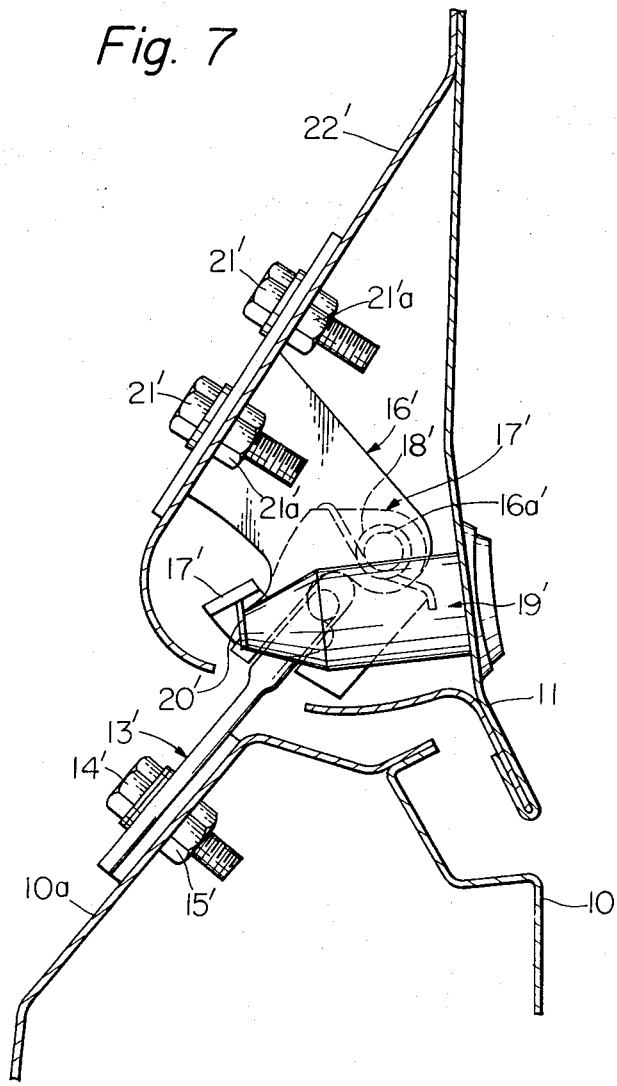

DEVICE FOR LOCKING A LID OF A LUGGAGE COMPARTMENT OF A MOTOR VEHICLE

This invention relates to a device for locking a trunk or luggage compartment of a motor vehicle.

Typical of various devices thus far proposed for locking lids of luggage compartments of motor vehicles is a device which comprises a striker secured to a luggage compartment of a motor vehicle, a lock lever mounted on a shaft which is secured to a corresponding lid. The lock lever has formed thereon a hook and a projection. The hook and the projection are substantially opposed to each other around said shaft. The device also comprises a spring mounted on the shaft for urging the hook to engage the striker. An outer lock cylinder is secured to the lid and an inner lock cylinder is disposed in the outer lock cylinder, the inner lock cylinder being rotatable when a key is inserted thereinto. The inner lock cylinder has formed at one end thereof a tip which is abutting on the projection of the lock lever. The tip urges the lock lever against the action of the spring to disengage or release the hook from the striker when the key is turned to its "unlock" position.

Since the spring exerts a considerable force in actual use, the tip of the inner lock cylinder and the projection of the lock lever tend to wear prematurely, resulting in a loose engagement between the tip and the projection after an extensive use of the device. As a result of this loose engagement, it sometimes happens that the lock lever remains engaged with the striker when the key is turned to its "unlock" position.

For avoiding premature wear between the tip and the projection, it is necessary to form the tip and the projection of relatively hard and thick materials. However, this causes an increase in cost.

Since the spring exerts a considerable force, a considerable effort is required to turn the key to its "unlock" position.

An object of this invention is therefore to provide a compact device for locking trunks or luggage compartments of motor vehicles for overcoming the shortcomings of the known art.

Another object of this invention is to provide a device for locking luggage compartments of motor vehicles which may be snugly accommodated in lids and the corresponding luggage compartments.

According to this invention, there is provided a device for locking a lid of a luggage compartment of a motor vehicle, the device comprising: a striker secured to the luggage compartment; a base member secured to the lid, said base member having a shaft; a lock lever rotatably mounted on said shaft, said lock lever having a lug extending transversely therefrom and having a hook adapted to engage said striker; an outer lock cylinder secured to the lid; an inner lock cylinder disposed in said outer lock cylinder, said inner lock cylinder being rotatable when a correct key is inserted thereinto; a cam integrated with said inner lock cylinder, said cam abutting on said lug at its periphery; and spring for subjecting said lock lever to a torque about said shaft to urge said hook to engage said striker; wherein a distance between said lug and said shaft is longer than a distance between said hook and said shaft; and wherein said lug and said hook are arranged about said shaft at an acute angle.

This invention is further described below by way of example with reference to the accompanying drawings, in which:

FIG. 7 is a view in section of another embodiment according to the invention.

Figure 1:
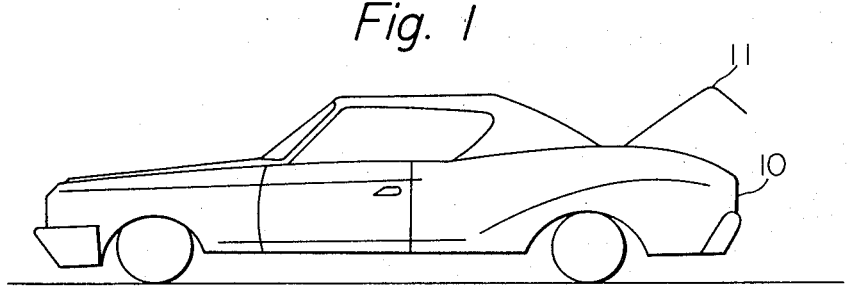
FIG. 1 is a view of a motor vehicle to which a device according to this invention may be incorporated.

Reference is first made to FIG. 1, there is shown a motor vehicle including a luggage compartment 10 and a lid 11 for the luggage compartment. A locking device according to this invention is specifically suited for use in the motor vehicle of the type above mentioned. The device is operated by a correct key 12.

Figure 2:
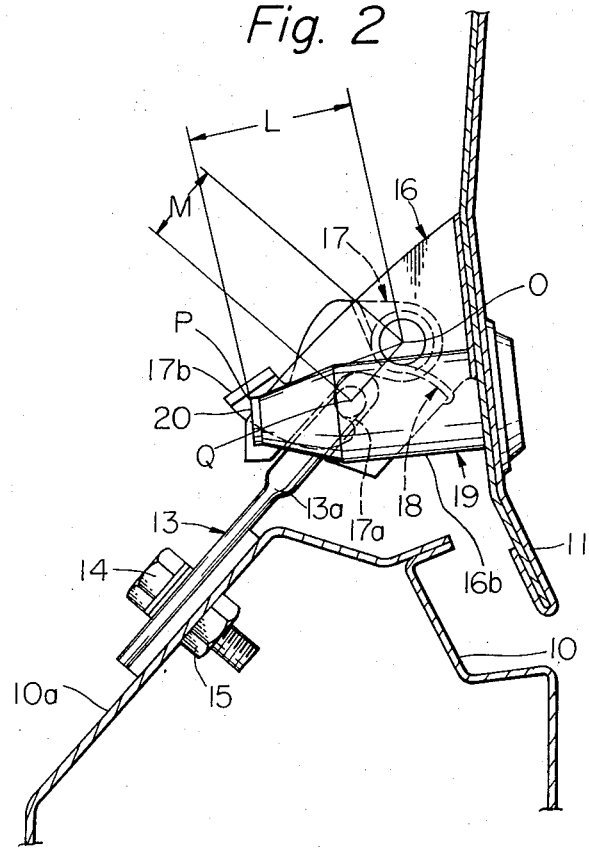
FIG. 2 is a view in section of a lid and a corresponding luggage compartment which can be used in the motor vehicle shown in FIG. 1 and shows a device according to the invention as installed on the lid and the luggage compartment.
Figure 3:
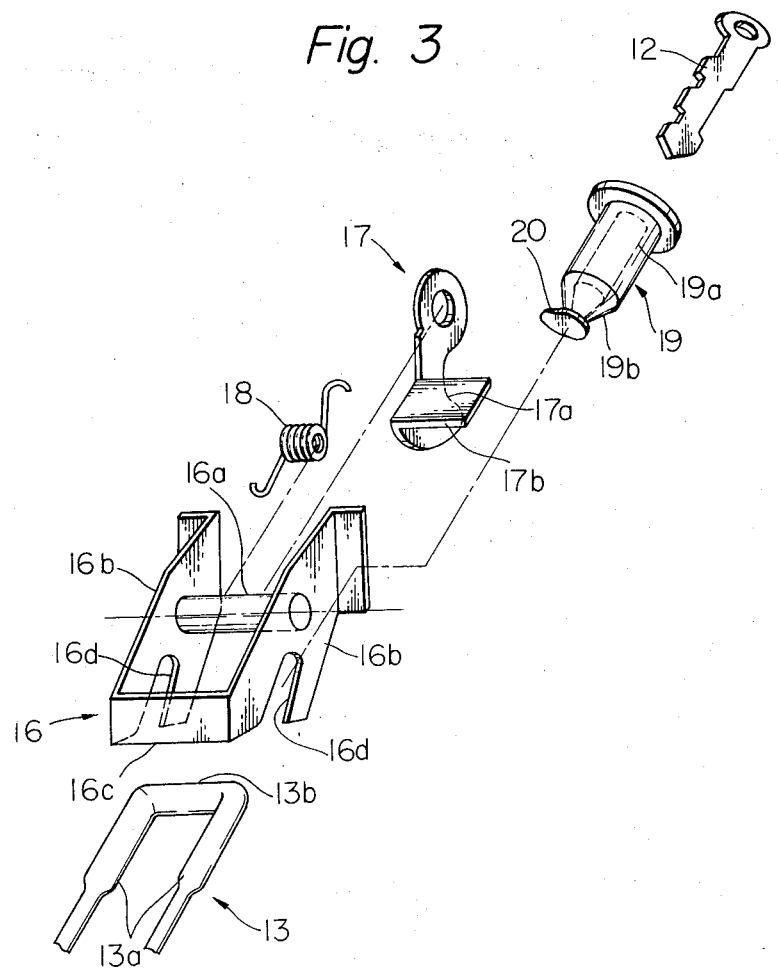
FIG. 3 is an exploded view of various parts of the device shown in FIG. 2.

As shown in FIG. 2, the device comprises a striker 13 secured to an included part 10a of the luggage compartment 10 by means of a bolt 14 and a nut 15. The striker 13 has two side rods 13a interconnected by a cross rod 13b, as best seen in FIG. 3, thus defining a rectangular opening. Since the luggage compartment 10 has formed on an inner wall thereof the inclined part 10a and the striker 13 is secured on the inclined part 10a, the striker 13 is disposed on a hypothetical plane which forms an acute angle with the longitudinal direction of the motor vehicle.

The device also comprises a base member 16, a lock lever 17, a spring 18 and a lock 19. The base member 16 is secured on the lid 11. The base member 16 has a shaft 16a carried or supported by two parallel plates 16b, the shaft 16a extending perpendicularly to the longitudinal direction of the motor vehicle. The two parallel plates 16b are extending from the lid 10 rectangularly thereto toward the striker 13. For the purpose of guiding the striker 13 toward the lock lever 17, notches 16d, as guide member, are provided on the two plates 16b, respectively. The base member 16 also has a member 16c interconnecting the two plates 16b.

The lock lever 17 has an opening through which the shaft 16a is extending. The lock lever 17 has formed thereon a hook 17a adapted to hook on or to engage the striker 13 and has also a lug 17b extending transversely from the lock lever 17. A distance L between an intersection O of the axis of rotation of the lock lever 17 with the lock lever 17 and a contacting point P of the hook 17a with the striker 13 is longer than a distance M between the intersection O and a contacting point Q of the lug 17b with a cam 20 which will be described hereinafter, as shown in FIG. 2. The lug 17b and the hook 17a are arranged about the shaft 16a at an acute angle (FIG. 2).

The spring 18 is mounted on the shaft 16a, subjecting the lock lever to a torque to urge the hook 17a to engage the striker 13.

The lock 19 comprises an inner lock cylinder 19a and a stationary outer lock cylinder 19b. The outer lock cylinder 19b is secured to the trunk lid 10. The inner lock cylinder 19a is disposed in the outer lock cylinder 19b. The inner lock cylinder 19a is rotatable in the outer lock cylinder 19b when the correct key 12 is inserted thereinto. The cam 20 is secured or calked to the inner end of the inner lock cylinder 19a as best seen in FIG. 3.

The operation of the device as above will now be described hereinafter.

When the lid 11 is in its closed position, the hook 17a of the lock lever 17 is securely engaged with the striker 13 by the action of the spring 18, as best seen FIG. 2.

Figures 4, 5, 6:
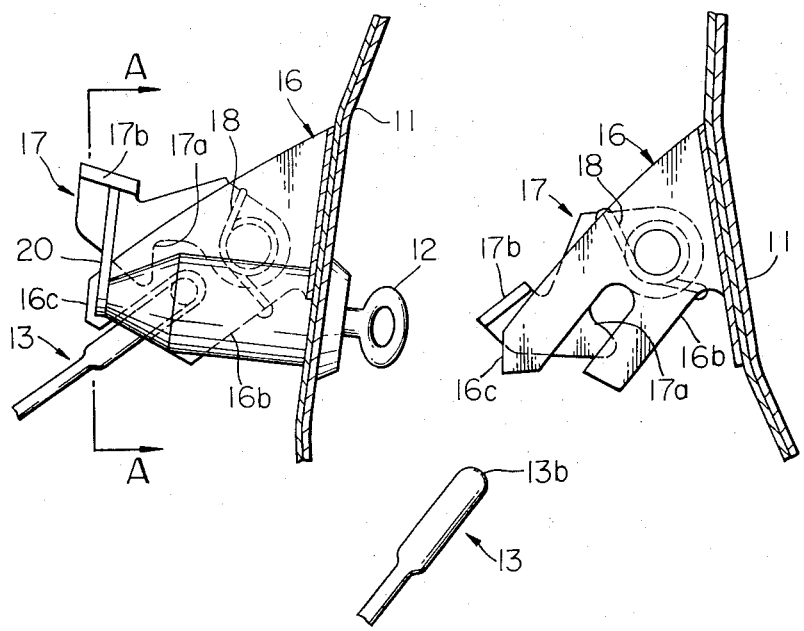
FIGS. 4 and 5 are views illustrating the operation of the device shown in FIGS. 2 and 3.
FIG. 6 is a section view taken along the line A—A of the device shown in FIG. 4, illustrating a striker, a lock lever and a cam of an inner lock cylinder.

In opening the lid 11 the key 12 is inserted in the inner lock cylinder of the lock 19 and then turned in a rotational direction to its "unlock" position, turning the cam 20 in the same rotational direction. As best seen in FIG. 6 the rotation of the cam 20 causes the lug 17b to lift to disengage the same from the striker 13, allowing the lid 11 to assume its open position.

When the lid 11 assumes its open position, the key 12 is forced to turn to its "lock" position as soon as the key 12 is released. Then the lock lever 17 assumes the position as best seen in FIG. 5. For the clarity of showing the position assumed by the lock lever 17 when the lid 11 is opened, the key 12, the lock 19 and the cam 20 have been ommitted in FIG. 5.

In closing the lid 11, the cross rod 13b of the striker 13 pushes the lock lever 17, urging the lock lever 17 to turn against the action of the spring 18 until it is trapped by the hook 17a of the lock lever 17.

As apparent from the foreging description, the distance L is larger than the distance M in the device according to this invention, significantly reducing the effort required to turn the key to its "unlock" position. This will be readily understood when considering the following equation;

$$a \times L = b \times M \quad (1)$$

Where;

a: a force applied on the cam 20 by the lug 17b at point P by the action of the spring 18 or a force required to turn the key to its "unlock" position; and b: a force applied to the striker 13 by the hook 17a at point Q by the action of the spring 18.

From the equation (1) it follows;

$$a = M/L \times b \quad (2)$$

Thus, it will be understood that the force a is always smaller than the force b in the device according to this invention.

According to this invention the lug and the hook are arranged about the shaft at an acute angle, increasing the acute angle enable us to significantly reduce the amount of the force a without increasing the length of the lock lever, contributing to the reduction of the bulk of the device.

Since the force that must be borne by the cam can be significantly reduced according to this invention, the cam and the lug may be made of thermo-setting resin materials, contributing the reduction of noise in turning the key to its "unlock" position.

Another embodiment according to this invention will be described hereinafter with reference to FIG. 7.

The device shown in FIG. 7 is different from the first embodiment in that a shielding member or panel 22' is provided to cover a base member 16', a spring 18', a lock 19' and a cam 20', and the base member 16' is secured on the shielding member 22', rather than a trunk lid 11'. As shown, the base member 16' is bolted to the shielding member 22' by two bolts 21' and nuts 21'a.

The shielding member 22' is secured on the trunk lid 11'. The shielding member 22' and the lid 11' define a space therebetween. The shielding member 22' is extending toward the rim of the lid 11' and is provided with an opening. The opening is provided to permit a striker 13' to extend toward the lock lever 17'. The striker 13' is secured on a luggage compartment 10' and disposed in a hypothetical plane forming an acute angle with the longitudinal direction of a motor vehicle.

The operation of this embodiment is the same as that of the first embodiment, thus the description of it will be omitted for the sake of simplicity.

Compared with the first embodiment the second embodiment in FIG. 7 has the following features.

Since the shielding member covers the parts which otherwise might injure a man when he is loading or unloading the baggage to or from the luggage compartment, it will not happen that a man is injured on his head by hitting his head against such parts.

Incidentally, since the lock lever is completely covered by the shielding member, nobody can disengage the hook from the striker without the correct key.

As is apparent from the foregoing, the advantages of the devices shown in the drawings are as follows:

On the lock lever the lug and the hook are arranged about the shaft at an acute angle, enabling us to set a distance between the lug and the shaft considerably larger than a distance between the hook and the shaft. The force that must be borne by the cam is significantly reduced. In addition to this, the device according to this invention is more compact. It will be appreciated that the wear between the cam and the lug can be significantly reduced, extending the life of the device without any loose engagement between the cam and the lug. It is also to be noted that the cam and the lug can be made of relatively thin material, with the result that the reduction of cost and the reduction of the noise when operating the key can be expected.

What is claimed is:

1. A device for locking a lid of a luggage compartment of a motor vehicle having a longitudinal direction, the device comprising: a striker secured to the luggage compartment; a base member secured to the lid, said base member having a shaft; a lock lever rotatably mounted on said shaft; said lock lever having a lug extending transversly therefrom and having a hook adapted to engage said striker; an outer lock cylinder secured to the lid; an inner lock cylinder disposed in said outer lock cylinder, said inner lock cylinder being rotatable when a correct key is inserted thereinto; a cam integrated with said inner lock cylinder, said cam abutting on said lug at its periphery; and a spring for subjecting said lock lever to a torque about said shaft to urge said hook to engage said striker; and wherein a distance between said lug and said shaft is longer than a distance between said hook and said shaft; and wherein said lug and said hook are arranged about said shaft at an acute angle.

2. A device as claimed in claim 1, wherein when said hook is initially engaged with said striker, rotation of the key to its "unlock" position causes said cam to lift said lug against the action of said spring.

3. A device as claimed in claim 2, wherein said striker is disposed in a hypothetical plane which forms an acute angle with the longitudinal direction of the motor vehicle.

4. A device as claimed in claim 3, wherein said shaft extends perpendicularly to the longitudinal direction of the motor vehicle.

5. A device as claimed in claim 4, wherein said base member has notches for guiding said striker toward said hook of said lock lever.

6. A device as claimed in claim 5, wherein said striker comprises two side rods and a cross rod interconnecting said two side rods, and wherein said cross rod abuts on said lock lever to urge said hook against the action of said spring until striker is trapped by said hook in closing the lid.

7. A device as claimed in claim 1, further comprising a shielding member covering said base member, said shaft, said lock lever, said inner and outer lock cylinders and said cam, said shielding member having an opening for permitting said striker to extend when the lid is closed.

* * * * *